United States Patent [19]

Cornelison et al.

[11] Patent Number: 5,140,812
[45] Date of Patent: Aug. 25, 1992

[54] CORE FOR AN ELECTRICALLY HEATABLE CATALYTIC CONVERTER

[75] Inventors: Richard C. Cornelison, Hiram, Ohio; Martin B. Sherwin, Potomac, Md.

[73] Assignee: W. R. Grace & Co.-Conn., New York, N.Y.

[21] Appl. No.: 787,861

[22] Filed: Nov. 5, 1991

[51] Int. Cl.⁵ .............................. F01N 3/20
[52] U.S. Cl. ...................... 60/300; 60/303; 422/174; 392/485; 392/375
[58] Field of Search .............. 60/299, 300, 303; 422/174, 180; 392/485, 486, 488, 490, 379

[56] References Cited

U.S. PATENT DOCUMENTS

| | | | |
|---|---|---|---|
| 3,723,070 | 3/1973 | Houdry | 23/288 F |
| 3,768,982 | 10/1973 | Kitzner | 23/288 F |
| 3,770,389 | 10/1973 | Kitzner | 23/288 F |
| 3,857,680 | 12/1974 | Porta et al. | 23/288 K |
| 3,886,739 | 6/1975 | Lee | 60/286 |
| 3,889,464 | 6/1975 | Gardner | 60/286 |
| 3,916,057 | 10/1975 | Hatch | 428/236 |
| 3,992,330 | 11/1976 | Noakes et al. | 252/466 J |
| 4,015,566 | 4/1977 | Wahl | 123/117 R |
| 4,023,928 | 5/1977 | Haensel | 21/74 R |
| 4,029,974 | 6/1977 | Brokaw | 307/296 R |
| 4,078,379 | 3/1978 | Minami et al. | 60/276 |
| 4,102,127 | 7/1978 | Saiki et al. | 60/284 |
| 4,186,172 | 1/1980 | Scholz | 422/180 |
| 4,272,668 | 6/1981 | Johnson et al. | 219/375 |
| 4,277,442 | 7/1981 | Hergart | 442/119 |
| 4,381,590 | 5/1983 | Nonnenmann | 29/157 R |
| 4,414,023 | 11/1983 | Aggen et al. | 75/124 |
| 4,598,063 | 7/1986 | Retallick | 502/439 |
| 4,671,931 | 6/1987 | Herchenroeder | 420/445 |
| 4,693,078 | 9/1987 | Dettling et al. | 60/295 |
| 4,702,892 | 10/1987 | Betz | 422/171 |
| 4,711,009 | 12/1987 | Cornelison et al. | 29/157 |
| 4,777,158 | 10/1988 | Cyron | 502/439 |
| 4,847,966 | 7/1989 | Kuchelmeister | 29/157 R |
| 4,852,530 | 8/1989 | John | 123/145 A |
| 4,909,994 | 3/1990 | Nishizawa et al. | 422/180 |
| 4,928,485 | 5/1990 | Whittenberger | 60/299 |
| 4,963,246 | 10/1990 | Nakajima et al. | 204/406 |
| 5,070,694 | 12/1991 | Whittenberger | 60/300 |

FOREIGN PATENT DOCUMENTS

| | | |
|---|---|---|
| 2333092 | 1/1975 | Fed. Rep. of Germany ........ 23/171 |
| 89/10470 | 11/1989 | Fed. Rep. of Germany . |
| 89/10471 | 11/1989 | Fed. Rep. of Germany . |

OTHER PUBLICATIONS

"Recent Developements in Electrically Heated Metal Monoliths", Whittenberger et al.; SAE Technical Paper Series 90053, Feb. 26, 1990.
Analog Devices: "Thermocouple Conditioner and Set Point Controller", AD596/AD597.
Motorola Semiconductor Technical Data MC68H811A2.
Abstract of DE 3446342-A 86.06.26.
Abstract of DE 3731888-A 89.04,13.
Allied Metglas Products-Catalogue Sheet.

Primary Examiner—Ira S. Lazarus
Assistant Examiner—L. Heyman
Attorney, Agent, or Firm—Edward J. Cabic

[57] ABSTRACT

There is provided an improved core for an electrically heatable catalytic converter, and an electrically heatable catalytic converter containing such core, said core characterized by having a plurality of subcircuits in which the heater strips of thin high temperature resistive metal alloy are in parallel and connected between an outer shell segment and a central structural member, and the plurality of such subcircuits is connected in series, whereby the resistance between the terminals of the electrically heatable catalytic converter is effectively raised.

22 Claims, 6 Drawing Sheets

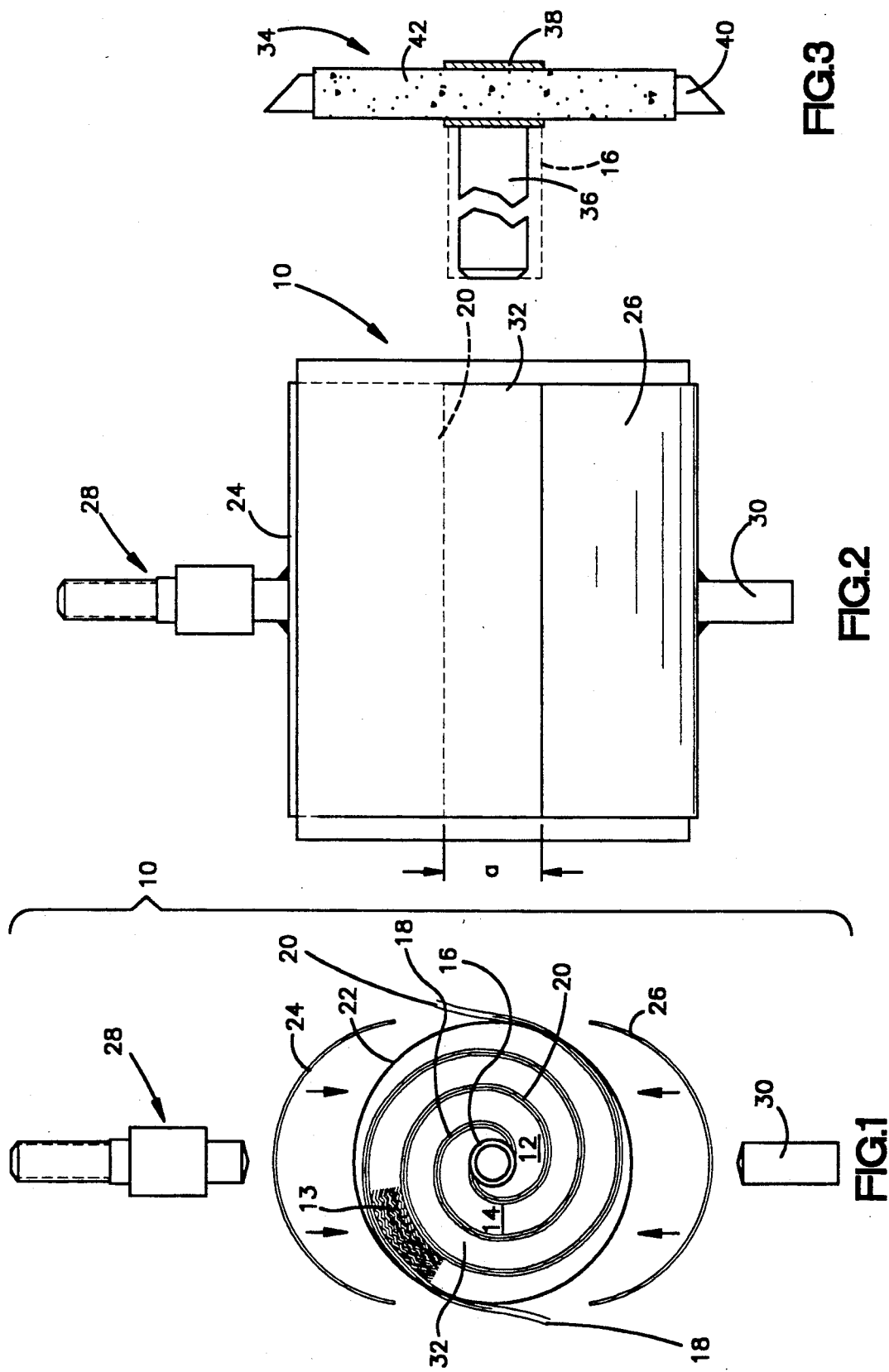

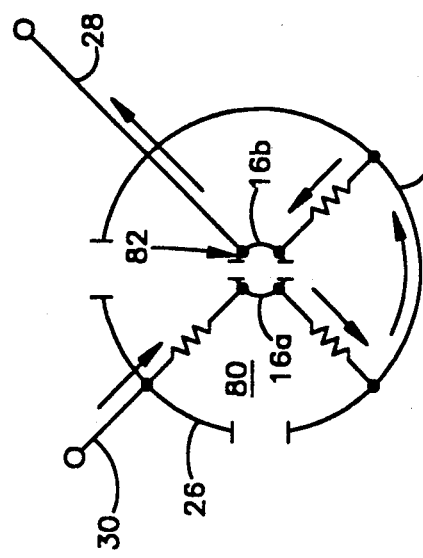
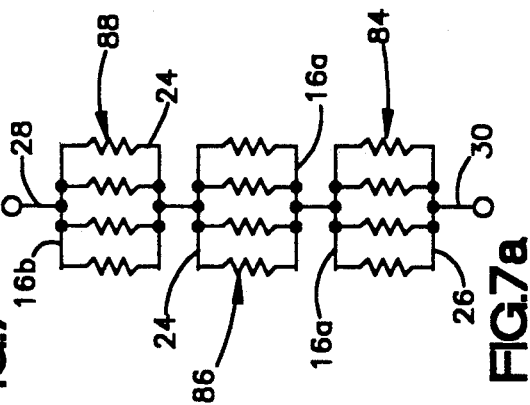
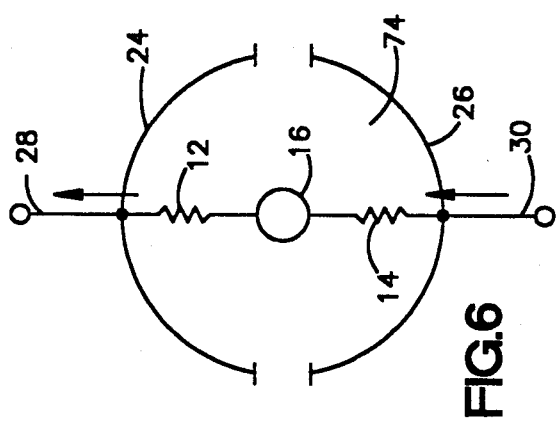
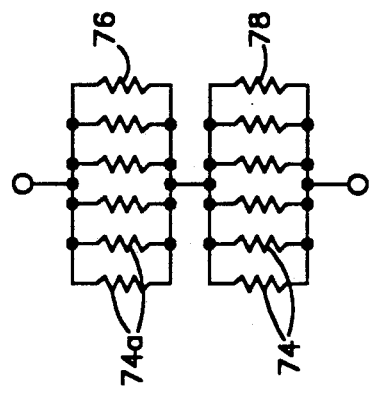
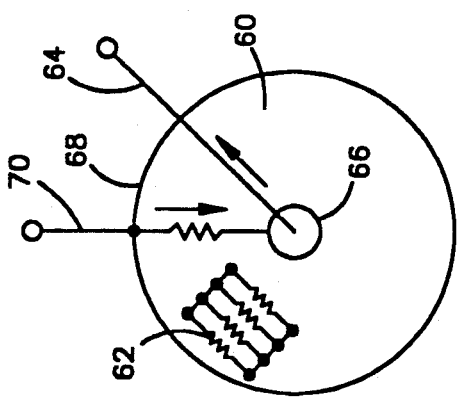
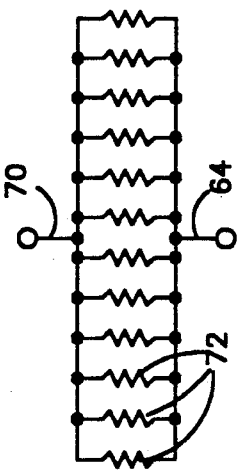

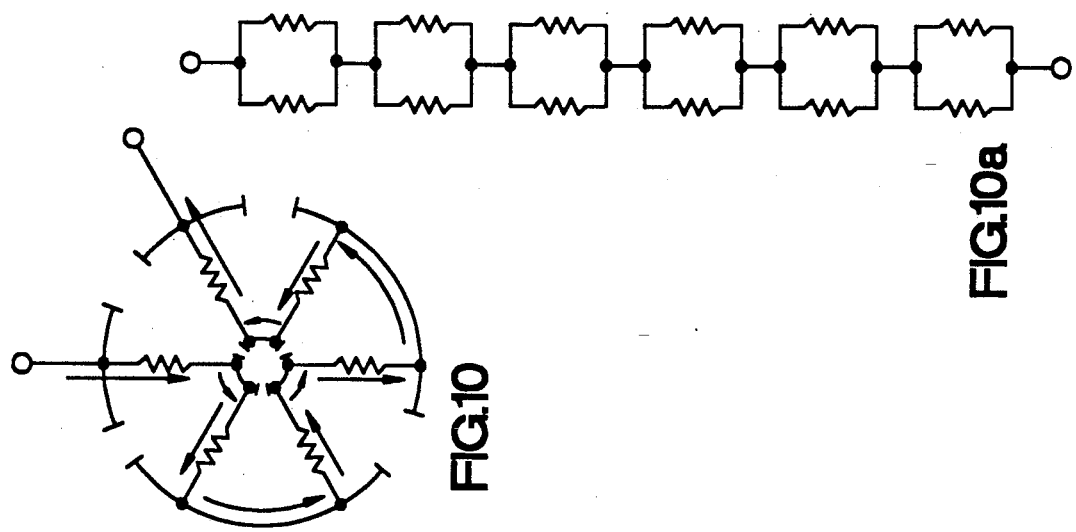
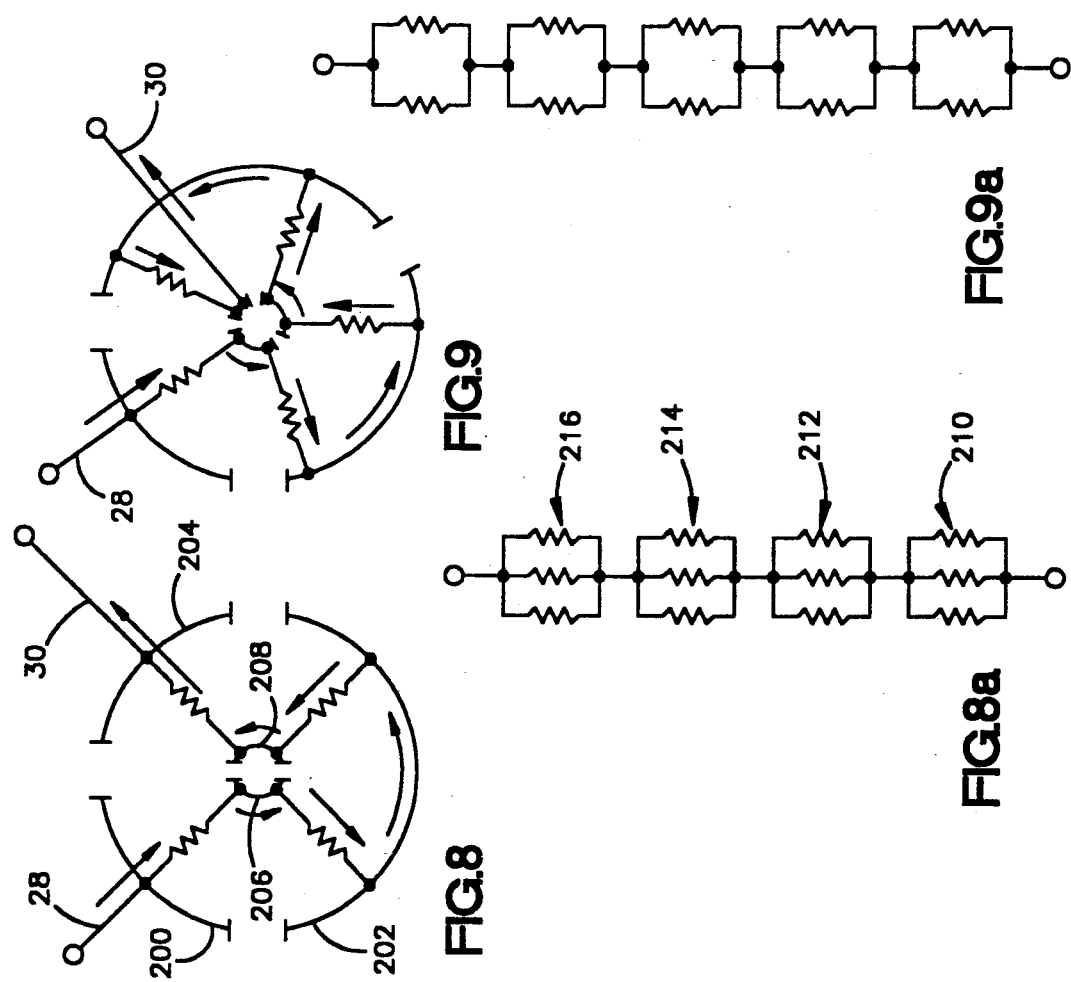

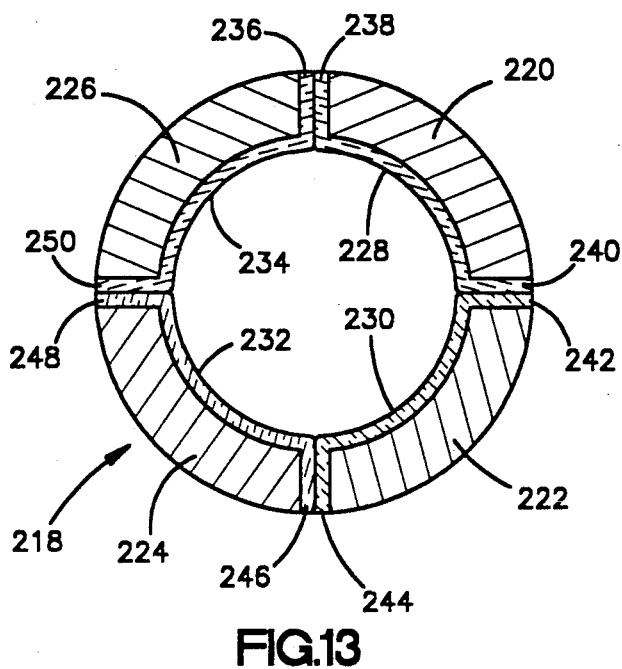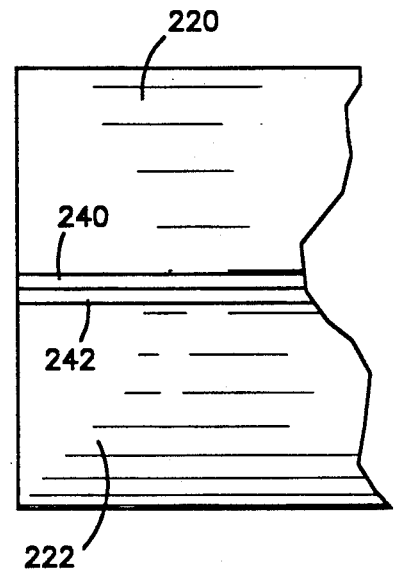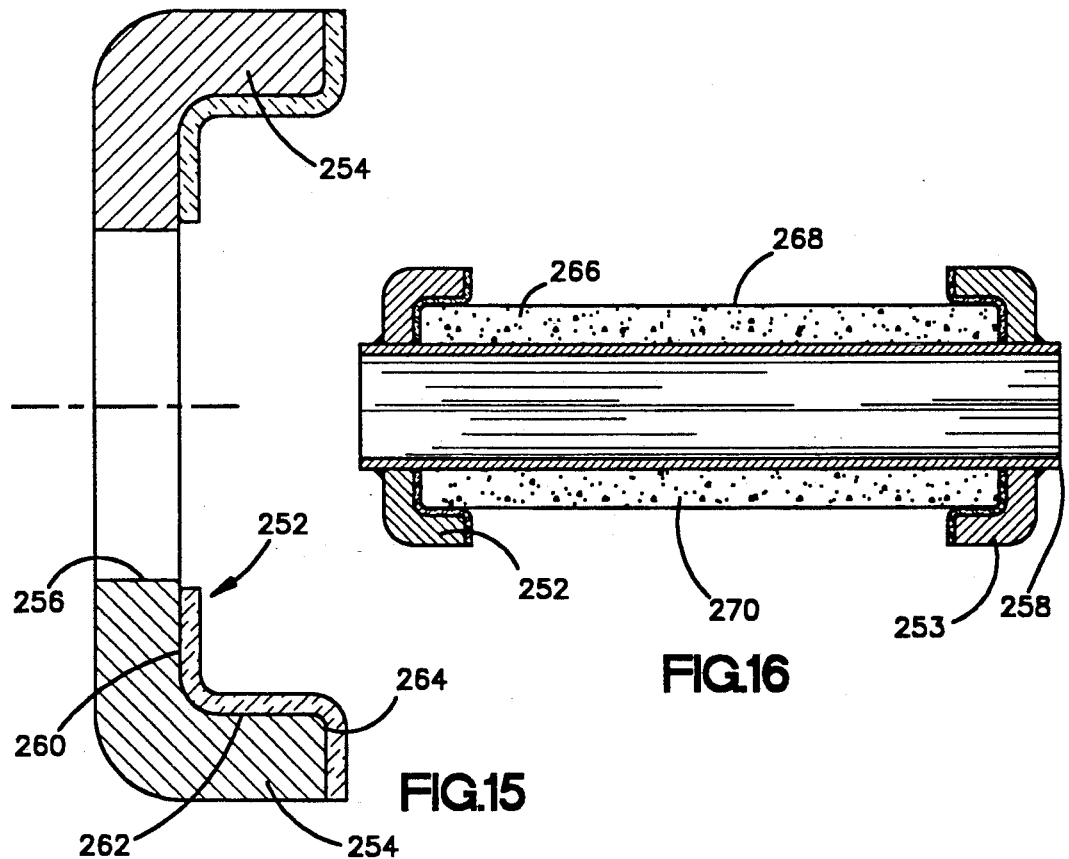

CORE FOR AN ELECTRICALLY HEATABLE CATALYTIC CONVERTER

The present invention relates to a corrugated thin metal monolith core for an electrically heatable catalytic converter, and more particularly, to a core characterized by a plurality of thin high temperature resistive metal alloy strips arranged in parallel to form subcircuits, and a plurality of such subcircuits arranged in series to obtain a desired resistance and optimize the core for its intended purposes.

BACKGROUND OF THE INVENTION AND PRIOR ART

The purpose of a catalytic converter for an internal combustion engine or a gas turbine is to convert pollutant materials in the exhaust, e.g., carbon monoxide, unburned hydrocarbons, nitrogen oxide, etc., to carbon dioxide, nitrogen and water. Conventional catalytic converters utilize a ceramic honeycomb monolith having square or triangular straight-through openings or cells with catalyst deposited on the walls of the cells; catalyst coated refractory metal oxide beads or pellets, e.g., alumina beads; or a corrugated thin metal foil monolith, e.g., a ferritic stainless steel foil or a nickel alloy, having a catalyst carried on or supported on the surface. The catalyst is normally a noble metal, e.g., platinum, palladium, rhodium, ruthenium, or a mixture of two or more of such metals. The catalyst catalyzes a chemical reaction, mainly oxidation, whereby the pollutant is converted to a harmless by-product which then passes through the exhaust system to the atmosphere.

However, conversion to such harmless by-products is not efficient initially when the exhaust gases are relatively cold. To be effective at a high conversion rate, the catalyst and the surface of the converter with which the gases come in contact must be at or above a minimum temperature, e.g., 390 F. for carbon monoxide, 570 F. for volatile organic compounds (VOC) and 1000 F. for methane or natural gas. Otherwise, conversion to harmless by-products is poor and cold start pollution of the atmosphere is high. Once the exhaust system has reached its normal operating temperature, the catalytic converter is optimally effective. Hence, it is necessary for the relatively cold exhaust gases to make contact with a hot catalyst so as to effect satisfactory conversion. Compression ignited engines, spark ignited engines and reactors in gas turbines have this need.

To achieve initial heating of the catalyst at or prior to engine start-up, there is conveniently provided an electrically heatable catalytic converter, preferably one formed of a thin metal monolith, either flat thin metal strips, straight corrugated thin metal strips, pattern corrugated thin metal strips, (e.g., herringbone or chevron corrugated) or variable pitch corrugated thin metal strips (See U.S. Pat. No. 4,810,588 dated Mar. 7, 1989 to Bullock et al), or a combination thereof, which monolith is connected to a voltage source, e.g., a 12 volt to 108 volt power supply, preferably at the time of engine start-up and afterwards to elevate and maintain the catalyst to at least 650 F. plus or minus 20 F. Alternatively, power may also be supplied for 5 to 10 or so seconds prior to start-up of the engine. Catalytic converters containing a corrugated thin metal (stainless steel) monolith have been known since at least the early seventies. See Kitzner U.S. Pat. Nos. 3,768,982 and 3,770,389 each dated Oct. 30, 1973. More recently, corrugated thin metal monoliths have been disclosed in U.S. Pat. No. 4,711,009 dated Dec. 8, 1987; U.S. Pat. No. 4,381,590 to Nonnenmann et al dated May 3, 1983, copending application U.S. Ser. No. 606,130 filed Oct. 31, 1990 by William A. Whittenberger and entitled Electrically Heatable Catalytic Converter and commonly owned with the present application, and International PCT Publication Numbers WO 89/10470 and WO 89/10471 each filed Nov. 2, 1989. However, a common problem with such prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at high temperature (between 800 and 950 C; 1472 to 1742 F., respectively) with exhaust gas from a running internal combustion engine simultaneously being passed through the device. If the electrically heatable catalytic device telescopes or display separation or folding over of the leading edges of the foil leaves up to a predetermined time, e.g., 5 to 200 hours, the device is said to fail the test. Usually a device will fail within 5 hours if it is going to fail. Five hours is equivalent to 1.8 million cycles at 100 Hertz.

The Hot Cycling test is conducted at 800 to 950 C. (1472 to 1742 F.) and cycled to 120 to 150 C. once every 15 to 20 minutes, for 300 hours. Telescoping or separation of the leading edges of the foil strips is considered a failure.

The Hot Shake Test and the Hot Cycling Test, hereinafter called "Hot Tests", have proved very difficult to survive, and many efforts to provide a successful device have been either too costly or ineffective for a variety of reasons.

Previously tested samples of EHC's in automotive service and comprised entirely of heater strips in electrical parallel, did not have adequate endurance in Hot Tests or did they satisfay the need for lower power ratings. In repeated efforts to arrive at a suitable design using purely parallel circuit construction, samples were made and tested with a wide range of parameters, including a length-to-diameter aspect ratio of from 0.5 to 1.5, cell densities of from 100 to 500 cells per square inch, individual strip heaters as long a 15 inches, and parallel circuits limited to a few as 2 to 4 heater strips.

Devices made according to these design parameters proved unsatisfactory because (a) terminal resistance was too low and therefore, the devices drew too much power, (b) the relatively high voltage differential between laminations associated with small numbers of parallel heater strips caused some arcing and, (c) Hot Tests could not be passed consistently. With regard to (c), EHC's with heater strips longer than about 7" have generally not passed the Hot Shake Test. Resistance that is too low causes one or more of the following problems: (a) the weight and size of the battery become unacceptably high and/or expensive; (b) the EHC has to be made so large in diameter that longer heater strips had to be used which induced a tendency to fail the Hot Tests.

Prior structures, such as that described in U.S. Pat. No. 4,928,425 have had all of the corrugated thin metal heater strip members connected in a manner such that all of the strips extended spirally outwardly from a central electrode to a circular shell which served as the electrode of opposite polarity. The strips serve as heaters for the core. However, power levels of less than 2.0 kilowatts cannot be achieved when all of the heater strips are in parallel because the terminal resistance of the EHC is too low.

It has now been found that by placing a plurality of the heater strips in parallel to form subcircuits, and a plurality of such subcircuits in series, it is possible to provide EHC devices which will survive the Hot Tests, and carry the proper power ratings for 12 through 108 volt automotive systems, as well as being suitable for a less costly power control system like that described in U.S. Ser. No. 587,219 filed Sep. 24, 1990 by Cornelison and Whittenberger, said application being commonly owned with the present application. The latter application is incorporated herein in full by reference thereto.

In the following description, reference will me made to "ferritic" stainless steel. A suitable formulation for ferritic stainless steel alloy is described in U.S. Pat. No. 4,414,023 to Aggen dated Nov. 8, 1983. A specific ferritic stainless steel useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. Another metal alloy especially useful herein is identified as Haynes 214 which is commercially available. This alloy is described in U.S. Pat. No. 4,671,931. This alloy is characterized by high resistance to corrosion. A specific example contains 75% nickel, 16% chromium, 4.5% aluminum, 3% iron, trace amounts of one or more Rare Earth metals, 0.05% carbon, and steel making impurities. Ferritic stainless steel and Haynes 214 are examples of high temperature resistive, corrosion resistant metal alloys. Suitable alloys must be able to withstand temperatures of 900 C. to 1100 C. over prolonged periods.

Other high temperature resistive, corrosion resistant metal alloys are known and may be used herein. The thickness of the metal foil heater strips should be in the range of from 0.0015" to 0.003", preferably 0.0016" to 0.002".

In the following description, reference will also be made to fibrous ceramic mat, woven fabrics, or insulation. Reference may be had to U.S. Pat. No. 3,795,524 dated Mar. 5, 1974 to Sowman for formulations and manufacture of ceramic fibers and mats useful herein. One such ceramic fiber material is currently available from 3-M under the registered trademark "NEXTEL" 312 Woven Tape.

BRIEF STATEMENT OF THE INVENTION

Briefly stated, the present invention is a core for an electrically heatable catalytic converter (EHC) comprising a central structural member, through which or by which electricity may be conducted, a segmented outer shell, each of said segments being electrically isolated from any other segment, except through thin metal strips forming the monolith, a plurality of thin metal alloy heater strips forming a monolith, each of said strips mechanically secured at its proximal end to said central structural member, and at its distal end to an outer shell segment, the metal alloy heater strips attached to a given segment being connected in parallel and defining a subcircuit, and the segments serving to connect the subcircuits in series thereby defining a resistance circuit. In preferred embodiments, the resistance at 20 C. (cold resistance) of the total of from 2 to 24 subcircuits in series is in the range of 0.023 ohms to 1.68 ohms per unit volume, and the total number of heater strips is from 2 to 24. Each strip has a cold resistance of approximately 0.07 ohms. Each strip is insulated from its neighboring strip by means of an oxide layer on the surface of the metal alloy strip, which insulation, in the preferred embodiment, is augmented by a thin refractory metal oxide coating applied as a washcoat and baked on. The heater strips may be flat strips, corrugated strips, or a combination of flat and corrugated strips.

In a specific embodiment, a corrugated thin ferritic stainless steel strip is 6.6" long, 2.85" wide and 0.002" thick, is precoated with a gamma alumina/ceria coating applied as a washcoat and baked, has a platinum/rhodium catalyst deposited thereon, and has a resistance of 0.073 ohms. Twelve such corrugated thin stainless steel strips are used in two parallel subcircuits of 6 heater strips each. The corrugations have an amplitude of from 0.04" to 0.09" and a pitch of 0.08" to 0.18". The cross-sectional shape of the corrugations may be triangular, truncated triangular, triangular with the apices rounded, wave-like, e.g., sinusoidal, etc. The pattern is desirably herringbone or chevron with sides having a slope of from 3 to 20 degrees, for example 16 degrees, to a line perpendicular to the edges of the foil strip. Alternatively, for lower pressure drop through the device, the pattern may be straight-through corrugations, including a straight-through variable pitch pattern such as described in U.S. Pat. No. 4,810,588 dated Mar. 7, 1989 to Bullock. The individual corrugated heater strips in the present application do not require being backed up with a flat strip to prevent nesting which increases cost. or do they require interleaf brazing which also increases cost. This latter expedient may be used, however, if desired.

It has been indicated above that there is provided a central structural member. The purpose of this member is to provide an anchor for the central part of the spirally wound monolith to resist axial movement, or telescoping in, for example, the Hot Shake Test. Presently, it is preferred to use a tubular member or a segmented tubular member (See FIGS. 13-16) to which heater strips are welded. Alternatively, the heater strips may be doubled in length and tightly compressed together at their midpoints, optionally brazed at this point, and passed through or partially around a rigid member or members. The rigid members may be electrically conducting or not; for example, it may be one or more centrally located ceramic or metallic rods at least equal in length to the axial length of the spirally wound core monolith, e.g., 2.85". See, for example, the structure of the central core portion in U.S. Pat. No. 4,928,485, supra. Such rigid central structures provide a mechanical means for supporting the proximal portions of the heater strips against telescoping under the conditions of the Hot Tests.

BRIEF DESCRIPTION OF THE DRAWINGS

The invention may be better understood by having reference to the annexed drawings showing a preferred embodiment of the invention and wherein:

FIG. 1 is an exploded end view of a core for an electrically heatable catalytic converter having two subcircuits in series, each subcircuit having 6 corrugated thin metal alloy foil strips connected in parallel as shown diagrammatically and schematically in FIG. 6a.

FIG. 2 is a side elevation of the core of FIG. 1 in assembled condition.

FIG. 3 is a side elevation of a support rod for a central electrically conducting member.

FIGS. 5 and 5a are diagrammatic and schematic illustrations of a core of the prior art in end view, and an electrical representation of the parallel relation of all the corrugated thin high temperature resistive metal alloy foil strips.

FIGS. 6 and 6a are diagrammatic and schematic illustrations of a core of the present invention in end view showing a split outer shell and a unitary electricity conducting central structural member, and an electrical schematic representation of the parallel/series relation of the corrugated thin high temperature resistive metal alloy foil strips using two subcircuits in series of six each parallel connected strips, respectively.

FIGS. 7 and 7a are diagrammatic and schematic illustrations of a core of the present invention in end view showing a split outer shell and a split electricity conducting central structural member, and an electrical schematic representation of the parallel/series relation of the corrugated thin high temperature resistive metal alloy foil strips using 3 subcircuits in series of parallel connected strips, respectively.

FIGS. 8 and 8a are diagrammatic and schematic illustrations of a core of the present invention in end view showing a split outer shell (three segments) and a split electricity conducting central structural member (2 segments), and an electrical schematic representation of the parallel/series relation of the corrugated thin high temperature resistive metal alloy foil strips using 4 subcircuits in series of parallel connected strips, respectively.

FIGS. 9 and 9a are diagrammatic and schematic illustrations of a core of the present invention in end view showing a split outer shell (3 segments) and a split electricity conducting central structural member (3 segments), and an electrical schematic representation of the parallel/series relation of the corrugated thin high temperature resistive metal alloy foil strips using 5 subcircuits in series of parallel connected strips, respectively.

FIGS. 10 and 10a are diagrammatic and schematic illustrations of a core of the present invention in end view showing a split outer shell (4 segments) and a split electricity conducting central structural member (3 segments), and an electrical schematic representation of the parallel/series relation of the corrugated thin high temperature resistive metal alloy foil strips using 6 subcircuits in series of parallel connected heater strips, respectively.

FIG. 12 is a diagrammatic and schematic illustration of a core of the present invention in end view showing a split outer shell (5 segments) and a split electricity conducting central structural member (5 segments) and using 10 subcircuits in series of parallel connected heater strips. The schematic for this figure is not shown, it being similar to the foregoing FIGS. 6a, 7a, 8a, 9a, 10a, and 11a.

FIG. 13 shows an end view on an enlarged scale of a segmented (4 segments) electricity conducting central structural member having plasma sprayed ceramic coating on the inner walls and confronting edges to electrically isolate the segments.

FIG. 14 shows the electricity conducting central structural member of FIG. 13 in fragmentary side elevation.

FIG. 15 shows a retaining cap for a segmented electricity conducting central structural member having a plasma sprayed ceramic coating on the inner surfaces.

FIG. 16 shows in longitudinal cross-section and on an enlarged scale, a fully assembled segmented electricity conducting central structural member.

Figure 4:
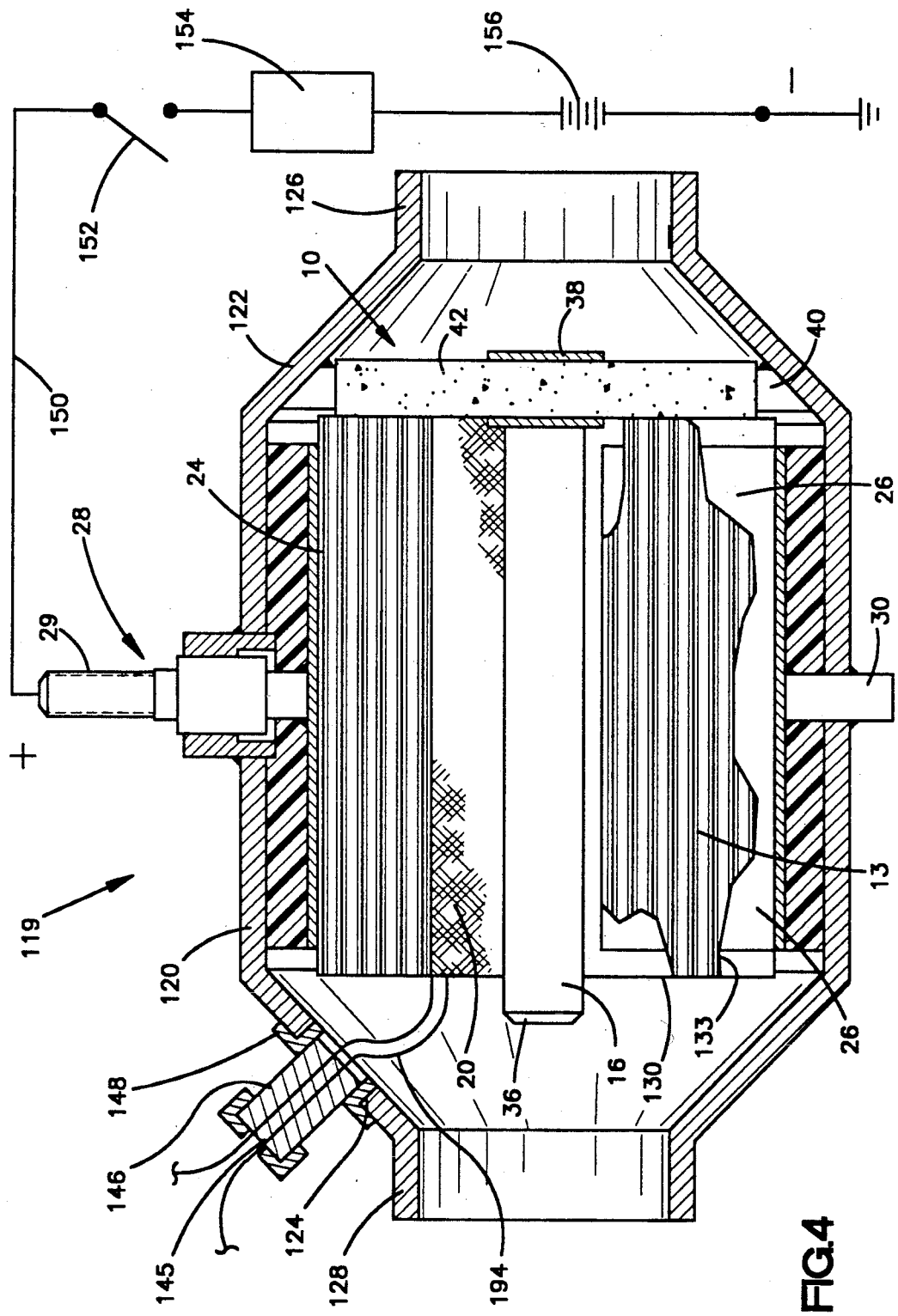
FIG. 4 is a cross-sectional side view of a fully assembled electrically heatable catalytic converter including the core of FIGS. 1, 2 and 3.

In the preferred embodiment, the heater strips are all corrugated, although, as indicated above, the heater strips may be flat, or flat alternated with corrugated. Also, in the preferred case, the heater strips are precoated prior to assembly with a refractory metal oxide washcoat coating and with a noble metal catalyst.

DETAILED DESCRIPTION OF THE INVENTION

As indicated above, the present invention is a novel arrangement and structure for a core useful in an electrically heatable catalytic converter. In order to produce the most effective and least expensive electrically heatable catalytic converter or EHC, requires a careful balance between the electrical requirements and the physical requirements of the device. This has been achieved in the devices of the present invention in that they will survive the Hot Tests and at the same time have relatively low power requirements and will come up to temperature quickly. For use in automotive applications, EHC designs need to be suitable for low cost mass production and be mechanically and catalytically durable. A critical requirement is the ability to reach a catalyst temperature of 650° F. or more within several seconds after voltage is applied to the terminals. Further, for the EHC to have widespread use, certain designs must be adaptable to higher voltage systems, e.g., 24 and 48 volt systems, which are expected to become common in the next 10 years. Electric vehicles are currently envisioned having a small constant speed gasoline driven engine to maintain battery charge and carrying batteries aggregating as much as 360 volts. The generator engine would require an EHC.

Conformance to the design parameters set forth herein enable EHC's to fit within a small window dictated by the multiple requirements of mechanical durability, electrical rating flexibility, electrical integrity, metallurgical strength, including especially creep strength at operating temperatures up to 1850° F. or higher, catalyst durability, all in designs capable of mass production.

In particular, these parameters include mechanical durability in the Hot Tests. These include the Hot Shake Test at 100 Hertz at about 900° C., 50 G's for 100 hours; mechanical durability for 300 hours in the Hot Cycle Test at about 900° C., a suitable level of catalyst activity at the conclusion of 100,000 mile durability tests so as to meet the California Ultra-Low Emission Vehicle (ULEV) or Low Emission Vehicle (LEV) standards, reasonable current draw so as to keep the battery size to a minimum, thermal mass sufficient to maintain "light-off" (oxidation of pollutants) when cold exhaust gases flow during a cold start mode; metal foil substrate with acceptable creep strength at 900° C., all in a design suitable for mass production.

EHC systems having a power rating in the range of 1.2 to 3.0 kw are suitable for use in about 80% of the world automobile market. This range of power provides for suitable post crank heating in most 2.0 liter engines and in some larger engines. Post crank heating eliminates the 5–10 second wait typically associated with pre-crank heating. This range of EHC power ratings for automotive applications represents a balance between rapid heat-up, reasonable battery size, and sufficient thermal mass in the EHC to sustain catalyst "light-off" as the initial cold exhaust gases from the engine fflow through the EHC. EHC's designed in the the above range of power enable automotive vehicles to achieve California's Ultra-Low Emission Vehicle specification of 0.04 grams of non-methane hydrocarbons per mile traveled according to the Federal FTP test procedure while at the same time conserving battery energy requirements.

For EHC's rated in the power range of from 1.2 to 2.5 kw, one each is used in each side of dual exhaust manifolds common in the U.S. market and encompass most engine displacements of from 3.5 to 5.0 liters.

According to the Whittenberger invention described in U.S. Pat. No. 4,928,485 dated 29 May 1990, there is provided a spiral assembly of corrugated thin stainless steel foil heater strips connected in electrical parallel. See FIGS. 5 and 5a.

The present invention provides flexibility to connect groups of corrugated thin high temperature resistive metal alloy heater strips in electrical parallel, while at the same time providing for these parallel groups, or subcircuits, to be internally connected in electrical series through a central structural member.

The internal connections within the cores of one embodiment of the present invention are achieved by providing (1) an insulating barrier between each group of corrugated thin high temperature resistive metal alloy strip heaters in electrical parallel, (2) a segmented outer electrode or shell, (3) an electrically floating internal electrode which may be segmented, and (4) the inner connections of the corrugated thin high temperature resistive metal alloy foil strip heaters (hereinafter "strip heaters") made in such a way that the necessary parallel and series circuitry connections are achieved, as discussed below. Insulation between contiguous strip heaters is provided by the refractory metal oxide coating on the surfaces of the strip heaters within a given parallel subcircuit. The several parallel subcircuits must be electrically isolated from one another by insulation means, for example, a separate woven ceramic strip, or the refractory metal oxide coating on the surface of the heater strips in contact between parallel subcircuits, such as hereinafter described.

By means of the present invention the range of resistance can be varied can be varied by up to 48:1 per unit catalyst volume relative to the original Whittenberger invention (supra) in which the range of resistance can be achieved over a ratio of only up to about 4:1 per unit catalyst volume.

The broader range of resistance in the present invention is important because of the following limitations which have been observed in EHC designs made according to the Whittenberger U.S. Pat. No. 4,928,485, supra: (1) The resistance at the EHC terminals can be increased to match to load requirements only by making the heater strips longer. However, heater strips longer than about 6.6" to 7" have marginal strength in the Hot Tests. (2) The resistance of the heater strips can be increased by decreasing the foil thickness. However, 0.0016 is already about the lower limit of commercial production processes in rolling mills for most high temperature resistive metal alloys. (3) The resistance of the heater strips can be raised by decreasing the width the width of the foil strips. However, this would decrease the mass required for sustaining "light-off" as well as the volume of noble metal catalyst needed for catalyst durability.

The advantages of the wide range of resistances available at the EHC terminals in the present invention include:

(1) The heater strip length can be shorter for a given power rating which lends greater mechanical strength to the core in tests such as the Hot Tests.

(2) The higher resistance at the EHC terminals decreases the power drawn by the EHC, thus allowing the EHC's hereof to serve in smaller cars and in dual exhaust systems.

(3) The higher resistance at the EHC terminals enables the EHC's to be used in vehicles with 24 and 48 volt systems as well as the 12 volt systems now in wide use.

In the preferred embodiments of this invention, the corrugated high temperature resistive metal alloy foil, especially ferritic stainless steel, and the super alloys containing aluminum, (e.g., Haynes 214), is precoated with a thin coating of a refractory metal oxide, e.g., gamma alumina containing refractory metal oxide, and conventional catalytic materials prior to being cut to length. The corrugated strips can be formed according to the process described in the aforesaid U.S. Pat. No. 4,711,009 omitting, however, the creasing and folding steps described in said patent, and substituting strip measuring and cutting steps. Means are desirably provided for removing the oxide coating on the ends of the strip lengths e.g., by wire brushing, so that the strips can be welded or brazed to the central structural member when it is metallic, and to the outer shell. Attachment of the proximal ends of the foil heater strips to an electricity conducting central structural member, or a segment thereof, is preferably by spot welding. Attachement of the distal ends of the foil heater strips to the outer shell is conveniently done by wrapping the spirally wound bundle (see FIGS. 1 and 2) with a thin sheet of brazing foil (such as a nickel-chromium-silicon-boron alloy "50/50A" or "80/80A" commercially available from Allied Metglas Products, Parsippany, N.J. 07054) wrapped therearound and the shell segments clamped thereto and the assembly induction heated to about 2150° F. to fuse the brazing foil. Placement of insulation strips between the parallel subcircuits, such as the type shown in FIG. 17, for example, is also made at this point in the assembly.

It is a distant advantage to the present invention that "precoated" heater strips can be made in accordance with the process of the aforesaid U.S. Pat. No.

4,711,009. This avoids a "post coating" process where the core, preferably before spirally winding, is dip coated in a washcoat containing alumina or other refractory metal oxide, or mixture of refractory metal oxides, and alcined, subsequent to which the noble metal catalyst is applied by dip coating followed by another calcining step. While "post coating" can be done in making the EHC devices hereof, "precoating" with a refractory metal oxide and catalyst is preferred. A thin coating, e.g., 0.0005" to 0.0010", of the refractory metal oxide, e.g., 75% gamma alumina/25% ceria, applied by wash coating and calcining serves as a dielectric to prevent short circuiting between contiguous heater strips connected in parallel in a given subcircuit.

It becomes convenient at this point to refer more specifically to the annexed drawings. In FIG. 1 there is shown in exploded fashion a core 10 for an electrically heatable catalytic converter of this invention. The core 10 contains 2 parallel subcircuits 12 and 14 the individual foil strips whereof are secured as by spot welding to an electricity conducting central structural member 16. The member 16 is desirably formed or nickel of 304 stainless steel. In this embodiment, the central structural member 16 is a unitary circular metallic tube. Each of the subcircuits 12 and 14 is composed of a plurality (say 6 each) of corrugated thin (0.002") ferritic stainless steel strips 13, each 6.6" long and 2.85" wide, for example. Strips 18 and 20 of "Nextel" 312 Woven Tape supplied by 3-M are interposed between the heater strip groups 12 and 14, optionally with flat thin high temperature resistive metal alloy foil strips on either side of the group to prevent the fibers of the insulation strips from blinding one side of the corrugated thin metal alloy strip, and the assembly tightly spirally wound about the central structural member 16. A thin layer of brazing metal foil 22 is wrapped around the resulting bundle and the shell segments 24 and 26, which are, in a specific embodiment 0.043" thick nickel clamped in place. The whole assembly is then induction heated to a temperature sufficient to fuse the brazing foil 22 and join the distal extremities of the heater strips 13, for example, to the outer shell segment. The outer shell segment is welded to a power feed through terminal 28 such as described in copending application of Sheller and Brunson, Ser. No. 759,712 filed Sep. 13, 1991 and entitled "Electrode Feed Through". The Sheller et al application aforesaid is commonly owned with the present application. The feed through 28 extends through the outer housing 120 (FIG. 4) for the EHC as described in connection with FIG. 4, and is connected to the positive pole of a conventional automobile battery, not shown.

A ground, or negative pole or terminal 30 is welded to the lower shell segment 26 and is attached to the chassis or directly to the negative pole of the automobile battery.

Thus, the path of the current supplying the electric energy to heat the core 10 is from the battery, not shown in FIG. 1 to (optionally via the chassis, also not shown) to the negative pole or terminal 30, through the lower shell segment 26, through fused brazing material 22 into the corrugated thin metal strips 14, through the central structural member 16, into the corrugated thin metal strips 12, through fused brazing material 22, into the upper shell segment 24 and out the feed through 28 and back to the battery, not shown. Note that the brazing metal is discontinuous so as not to short out the shell segments. Thus, the shell segments may be viewed as serving as an intermediate termination and interconnection means within the electrically heatable catalytic converter.

A power control system, such as described in U.S. Ser. No. 587,219 filed by Cornelison et al on Sep. 24, 1990 and to which reference may be had, is conveniently used in conjunction with the EHC's hereof.

FIG. 2 shows in assembled form a side view of the core of FIG. 1, like numbers indicating like parts. Note that the shell segments 24 and 26 fail to completely encircle the core winding 32 by a distance "a" or about 0.5" (in a specific embodiment) on each side.

FIG. 3 shows in side view, a support rod assembly generally indicated at 34. The support rod 34 includes a pin or yoke 36 fitted with a sleeve 38. The pin or yoke 36 is dimensioned to fit inside and plug the central structural member 16 (FIG. 1). The sleeve 38 is dimensioned for an interference fit, e.g., a press fit, with a ceramic coated pin 40 to act as insulation and electrically isolate the rod 34. The ceramic coated pin 40 is dimensioned to fit within and be welded to the outer EHC housing (See FIG. 4). The ceramic coating 42 is desirably plasma spray applied refractory metal oxide, e.g., alumina, alumina/titania, alumina/ceria, titania, titania/ceria, magnesium zirconate, etc. at least about 0.01" thick. Slight irregularities in the surface can be removed by sanding or otherwise abrading the coated surface, e.g., centerless abrading.

FIG. 4 is a cross-sectional view of a fully assembled ECH 119 utilizing a core of this invention, such as that shown in FIG. 1, with a support rod, such as that shown in FIG. 3 on the downstream end of the core 130. This assembly is ready for insertion in an exhaust line of the internal combustion engine. The converter 119 is provided with a stainless steel, e.g., #304 Stainless Steel, or nickel housing 120 having flared end caps 122 and 124, and nipples 126 and 128 integral therewith. The nipples 126 and 128 are dimensioned to accommodate an exhaust pipe, e.g., a 2.5" ID pipe. The housing 120 contains an electrically heatable catalytic converter core 130, e.g., that shown in FIG. 1. The core 130 of FIG. 4 defines a plurality of generally axially extending cells 133 diagrammatically shown as a plurality of parallel lines in a partially cut-away portion of the upper and lower shell segments 24 and 26. The core 130 is permeable to exhaust gas and, as indicated above, is formed of a plurality of corrugated thin high temperature resistive metal alloy strips 13 (FIG. 1). The corrugated thin heater strips 13 are secured to the central electricity conducting structural member 16, as indicated above, as by spot welding along with insulation strips, e.g., insulation strip 20. The electrical terminals 28 and 30 extend through the housing 120 and are suitably connected to a power source 156 through a power switching device 154 (see Ser. No. 587,219, supra) by cable 150 and switch 152. The core assembly, such as that shown in FIGS. 1 and 2, is wrapped in flexible ceramic fiber electrical insulation 142, desirably 1/16" to ⅜" thick and inserted into the housing 120. A suitable ceramic felt is described in the Hatch U.S. Pat. No. 3,916,057 dated Oct. 28, 1975. The insulation 142 electrically isolates the core 130 from the housing 120. The end caps 122 and 124 are the last parts to be attached as by seam welding. Optionally a thermocouple 194 having a junction 195 may be placed in the core 130 to sense temperature. The leads of the thermocouple 194 pass through an insulator 146, preferably ceramic, and bushing 148 extending through the end cap 124. The projecting stud 29 of the terminal feed through 28 is desirably threaded to accept a nut, or a pair of nuts, to hold a cable connector, not shown, from cable 150 extending from the positive pole of the battery as above indicated. The negative pole of the battery, which may be a 12 volt, 24 volt, or a 48 volt battery, for example, is often indirectly attached to the terminal 30 through the chassis of the vehicle which, in turn, is attached to the battery by a ground strap.

The cell density of the core 130 is conveniently in the range of 80 to 350 cells per square inch, preferably 100 to 180 cells per square inch, specifically, 160 cells per square inch.

The catalytic converters hereof are referred to as "electrically heatable." This is to indicate that power is supplied to the converter on demand from the time of engine start-up, and possibly prior to engine start-up, or at any time the temperature is sensed to be below a predetermined set point.

FIG. 5 shows in diagrammatic and schematic form an end view of a prior art core 60, with strip heaters being represented by the fragmentary portion 62. The power lead 64 is attached to the central core member 66, and the corrugated thin high temperature resistive metal alloy strips conduct power from the core 66 spirally outwardly along the corrugated alloy strips 72 to the shell 68 and to terminal 70 to complete the heater portion of the electrical circuit, a resistance symbol representing the strips 72. FIG. 5a diagrammatically represents the parallel relationship of all the corrugated high temperature resistive metal alloy strips 72 extending between the terminals 54 and 70. Here, the corrugated thin metal alloy strips 72 are all in parallel relationship.

FIGS. 6 and 6a show diagrammatically and schematically the electrical arrangement in a core having in series, two parallel subcircuits of 6 heater strips each. Thus, in FIG. 6 current is represented by arrows as entering the core portion 74 through the resistance of the corrugated thin strips 14 (FIG. 1) to the central electricity conducting structural member 16. The member 16 is a unitary stainless steel or nickel tube which is not connected directly to any terminal of a power source. The member 16 can be thought of as "floating" electrically between the parallel subcircuit 14 and the parallel subcircuit 12. Current flows through the resistance of the corrugated thin high temperature resistive metal alloy strips 12 through the shell segment 24 and then to the terminal post 28. FIG. 6a diagrammatically illustrates the parallel connected resistance heater strips 74 in subcircuit 78, and the parallel connected heater strips 74a in subcircuit 76 connected in series. The arrows show the paths of current flow in FIG. 6.

FIGS. 7 and 7a show diagrammatically and schematically the electrical arrangement in a core having three parallel subcircuits in series. Thus, current is shown entering the core 60 through the terminal 30 and the shell segment 26, and going through the resistance of the resistance heater strips to the core member segment 16a and out through another like resistance to a shell segment 24. Current then traverses the shell segment 24, which is isolated from segment 26, to the resistance heater strips and back to a different segment 16b of the split core member 82 and then out the terminal 28 to complete the EHC portion of the circuit. FIG. 7a is like FIG. 6a and shows diagrammatically the series relationship of the 3 parallel subcircuits 84, 86 and 88. The arrows show the current path through the three parallel subcircuits in FIG. 7.

FIGS. 8 and 8a show diagrammatically and schematically the electrical arrangement in a core having four parallel subcircuits in series. The shell is divided into three segments 200, 202, and 204, and the core member divided into two segments 206 and 208. The heater strips run from one shell segment, e.g., 200, to a core member segment, e.g., 206, and then out to a separate shell segment, e.g., segment 202, which is electrically isolated from segment 200. FIG. 8a shows diagrammatically in the same manner as FIG. 7a, the series relationship of the four parallel subcircuits 210, 212, 214 and 216. The arrows indicate the current path through the four parallel subcircuits in series in FIG. 8.

FIGS. 9 and 9a show diagrammatically and schematically the electrical arrangement for five parallel subcircuits in series. Here the shell is divided into three segments and the central member is divided into three segments. The arrows indicate the current path through the five parallel subcircuits in series in FIG. 9. FIG. 9a shows diagrammatically in the same manner as FIG. 8a, the series relationship of the five parallel subcircuits.

FIGS. 10 and 10a show diagrammatically and schematically the electrical arrangement in a core having six parallel subcircuits in series. Here, the shell is divided into four segments, and the central member is divided into three segments. Here again, the arrows indicate the current path through the six parallel subcircuits in series and FIG. 10a represents the series relationship.

Figure 11:
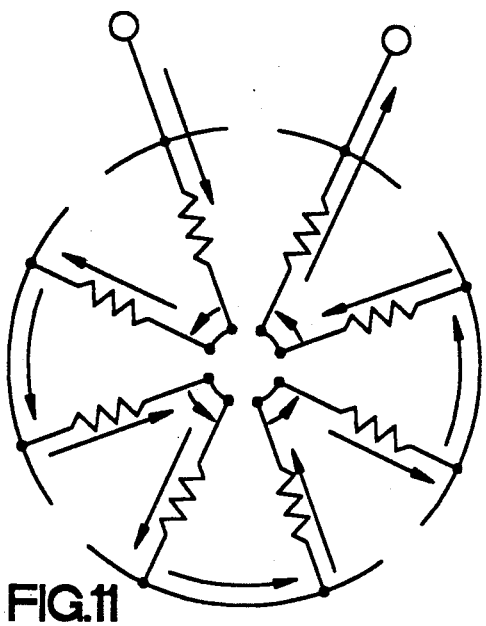
FIGS. 11 and 11a are diagrammatic and schematic illustrations of a core of the present invention in end view showing a split outer shell (4 segments) and a split electricity conducting central structural member (4 segments), and an electrical schematic representation of the parallel/series relation of the corrugated thin high temperature resistive metal alloy foil strips using 8 subcircuits in series of parallel connected heater strips, respectively.
Figure 11A:
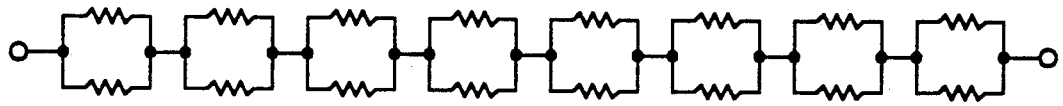

FIGS. 11 and 11a show diagrammatically and schematically the electrical arrangement in a core having eight parallel subcircuits in series. Here, the shell is divided into five segments and the central member is divided into four segments. The arrows indicate the current path through the six parallel subcircuits in series in FIG. 11. FIG. 11a shows the series relationship of the parallel subcircuits.

Figure 12:
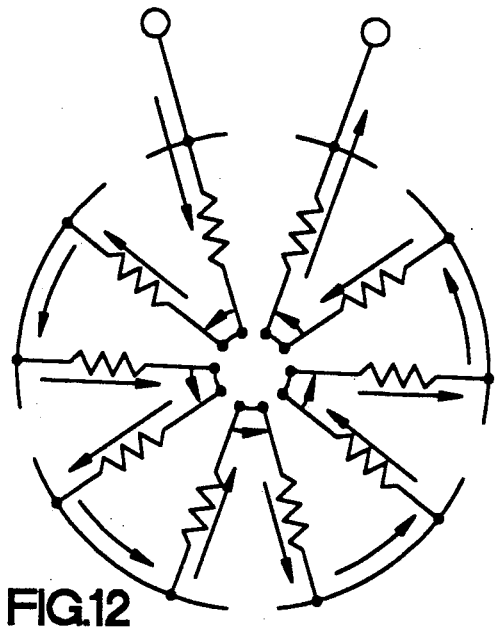

FIG. 12 shows diagrammatically and schematically the electrical arrangement in a core having ten parallel subcircuits in series. Here, the shell is divided into six segments and the central member is divided into five segments. The arrows indicate the current path through the ten parallel subcircuits in series in FIG. 12. The schematic for the parallel series arrangement, not shown, is like those shown in FIGS. 5a, 6a, 7a, 8a, 9a, 10a, and 11a, but having two additional parallel subcircuits to those shown in FIG. 11a.

Those skilled in the art are believed to have been fully informed by the drawings and the description with respect to FIGS. 5 and 5a, 6 and 6a, 7 and 7a, etc. to fully understand the mode of arranging the parallel subcircuits in series in accordance herewith to obtain virtually any desired resistance for the core.

The following Table I gives an analysis of the resistance combinations in Ohms in embodiments of spirally wound EHC's for up to twenty four heater strips. All corrugated resistance heater strips in Table I are Alfa IV ferritic stainless steel, which foil is commercially available from Allegheny Ludlum Co., are 6.6" long by 2.85" wide and 0.0016" thick, and have a resistance at 20 C. of 0.073 ohms. The corrugations have an amplitude of 0.05" a pitch of 0.125" and in a herringbone pattern wherein the slope of a side of the pattern is 16 degrees to a line normal to the parallel longitudinal margins of the strip. The strips are coated with a gamma alumina/ceria coating and provided with a platinum/rhodium catalyst. A portion of the process described in the aforesaid U.S. Pat. No. 4,711,009 may be used to produce such heater strips. In general, the cold resistance of the heater strips in parallel in each subcircuit is in the range of 0.02 ohms to 0.2 ohms, the total number of heater strips is from 2 to 24, preferably from 6 to 12, and each heater strip has a cold resistance of approximately 0.07 ohms.

TABLE I

TERMINAL RESISTANCE IN OHMS OF THE CORE

| No. in Parallel per subcircuit | Total No. of Heater Strips @ 0.073 Ohms Each | | | | | | | |
|---|---|---|---|---|---|---|---|---|
| | 2 | 4 | 6 | 8 | 10 | 12 | 14 | 24 |
| 0* | 0.146 | 0.292 | 0.438 | 0.584 | 0.730 | 0.876 | 1.022 | 1.752 |
| 2 | 0.037 | 0.073 | | 0.146 | 0.183 | 0.219 | 0.256 | |
| 4 | | 0.018 | | 0.037 | | 0.055 | | |
| 6 | | | 0.012 | | | 0.024 | | |
| 7 | | | | | | | 0.021 | |
| 8 | | | | 0.009 | | | | |
| 10 | | | | | 0.007 | | | |
| 12 | | | | | | 0.005 | | |

*0 in parallel means all strips in series.

The Ohmic values of 0.018 ohms, 0.012 ohms, 0.009 ohms, 0.037 ohms and 0.024 ohms for EHC's in accordance herewith satisfy the requirements of the major number of current automobile engine sizes from 1.8 liters to 5.0 liters, and hence, are the preferred electrical parameters for the present invention.

FIG. 13 is an end view of a segmented (four segments) electricity conducting central structural member having plasma sprayed ceramic coating on the inner walls and confronting edges to electrically isolate the segments. FIG. 14 is a fragmentary side view of the central member shown in FIG. 13. Thus, there is shown in FIG. 13 nickel metal segments 220, 222, 224, and 226 defining a circular tubular central structural member generally indicated at 218. The inner walls are coated with a plasma sprayed refractory metal oxide, e.g., an alumina layer about 0.01" thick, as are the confronting radial faces 236, 238, 240, 242, 244, 246, 248 and 250. The outer surfaces of the segments 220, 222, 224 and 226 are free of any refractory metal oxide coating so that thin high temperature resistive metal alloy foil heater strips may be spot welded thereto. FIG. 14 shows a fragmentary side elevation of the central structural member shown in FIG. 13.

FIG. 15 shows on an enlarged scale and end cap generally indicated at 252. The end cap 252 is a circular washer of nickel or #304 Stainless Steel having a peripheral flange or lip 254 and a central hole 256 to accommodate a central tube 258 (FIG. 16). The inner surfaces 260, 262 and 264 are coated with refractory metal oxide, e.g., gamma alumina/ceria coating, applied preferably by plasma spray. The central hole 256 need not have its axially extending walls coated.

FIG. 16 shows an assembled segmented central electricity conducting structural member, such as that shown in FIGS. 13 and 14, utilizing two end caps, such as that shown in FIG. 15. A tube 258 of nickel, or #314 Stainless Steel, is contained within the segmented member 266. The segments 268 and 270, for example, with their ceramic coated surfaces facing the tube 258, are placed about the tube 258, the end caps 252 and 253 placed around the ends of the segments, e.g., segments 268 and 270, and the ends of the tube 258 welded to the openings, e.g., opening 256, in the respective end caps 252 and 253. There is thus provided a segmented electricity conducting central structural member having four segments (see FIG. 11). Other segmented electricity conducting central structural members of from 2 to 5 or more segments may be constructed in the same manner.

Figure 17:
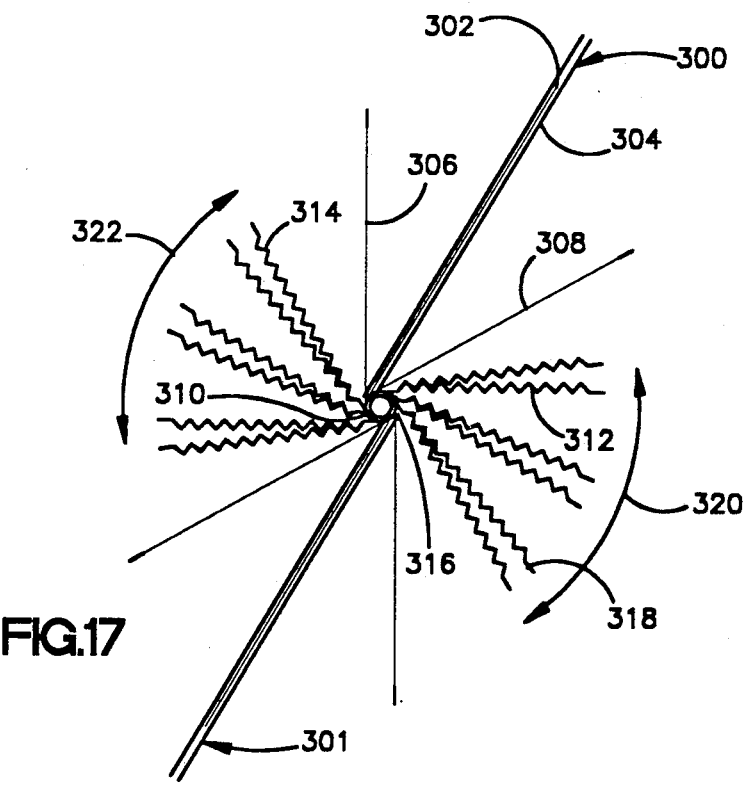
FIG. 17 shows in cross-section a section of a unitary electricity conducting central structural member having a plurality of corrugated thin high temperature resistive metal alloy foil strips secured thereto as by welding and a pair of insulating strips secured thereto as by welding for dividing and electrically isolating the parallel connected strips in to two series connectable portions.

FIG. 17 shows one form of insulator between the parallel subcircuits using two parallel subcircuits. The insulator 300 of FIG. 17 is the invention of William A. Whittenberger, and the rights thereto are commonly owned with the present invention. Essentially, the insulator strip 300 is composed of an inner metallic flat strip 302 and a sleeve 304 of woven ceramic fiber, e.g., 3-M's NEXTEL woven tape. The strip 300 is about two inches longer than the normal heater strip and is shown extending outside of the core member as shown in FIGS. 1 and 2. Optionally, there are provided a pair of foil separator strips 306 and 308 for each insulator strip (there being two in the illustrated core assembly) which are desirably formed by folding a flat single strip of alfa IV Ferritic Stainless Steel in half, the ends of the folded strip for strips 306 and 308 being cleaned of refractory metal oxide coating so as to enable spot welding to an electricity conducting central structural member. Corrugated thin high temperature resistive metal alloy heater strips, e.g., heater strip pairs 312 and 314, for example, in each of two parallel subcircuits, shown, are also welded to the central structural member 310. It should be noted that, as shown in FIG. 17, the heater strips may conveniently be formed in pairs by folding in half a precut length twice the intended length. The proximal and distal ends, e.g., proximal end 316 and distal end 318 are cleaned of any refractory metal oxide, e.g., alumina/ceria, coating to permit welding or brazing as the case may be. The foregoing subassembly is then spirally wound to form a tight core, foil brazing metal strips placed about the core, and the shell segments, not shown in FIG. 17 (but see FIG. 1) applied and brazed to the distal ends of the corrugated thin high temperature resistive metal alloy strips. Thus, there are provided two parallel subcircuits 320 and 322 connected to the outer shell, e.g., outer shell segments 24 and 26 of FIG. 1, electrically isolated from one another by the insulator strips 300 and 301, but joined in series through the unitary electricity conducting central structural member 310.

The term "corrugated" as used herein will be understood as including straight-through of regular pitch, or variable pitch as described, for example, in the aforesaid Bullock U.S. Pat. No. 4,810,588 dated Mar. 7, 1989, the disclosure of which U.S. Patent is incorporated herein by reference thereto. The straight-through corrugation structures, whether regular pitch with alternating flat strips to prevent nesting, or variable pitch which can be made non-nesting, are particularly advantageous herein because, unlike the herringbone pattern corrugations which provide a longer more obstructed gas flow path, the straight-through corrugations have a considerably lower back pressure effect on the exhaust stream. The lower back pressure translates into better fuel mileage. Moreover, particularly with the variable pitch corrugations, the contact between contiguous layers of corrugated thin high temperature resistive metal alloy strips is plural line contact rather than point contact where the apices of herringbone or chevron corrugations cross contiguous apices of herringbone or chevron corrugations. Durability is much better with the variable pitch corrugations. Corrugations which are discontinuous, i.e., extending only part way across the width of the foil strip and being staggered longitudinally of the strip may also be used herein.

There has thus been provided an improved electrically heatable catalytic converter having a plurality of parallel subcircuits each composed of a plurality of heater strips in parallel, such subcircuits being connected in series thereby providing resistance at the EHC terminals foe optimum heating characteristics with a voltage source, e.g., 12 volts to 48 volts or higher. The device is also characterized by mechanical strength so as to enable it to survive the Hot Shake Test and the Hot Cycling Test.

What is claimed is:

1. A core of an electrically heatable catalytic converter comprising: (a) a central structural member; (b) a segmented outer shell, each of said segments being electrically isolated from any other segment except through a plurality of thin high temperature resistive metal alloy heater strips; said plurality of heater strips forming a monolith, each of said heater strips being secured at its proximal end to said central structural member and at its distal end to an outer shell segment, the heater strips attached to a common shell segment being connected in parallel and defining a subcircuit, and the shell segments being connected in series through the central structural member and the heater strips.

2. A core for an electrically heatable catalytic converter as defined in claim 1 wherein the central structural member is an electricity conducting member.

3. A core for an electrically heatable catalytic converter as defined in claim 2 wherein the electricity conducting central structural member is formed of a stainless steel.

4. A core for an electrically heatable catalytic converter as defined in claim 2 wherein the electricity conducting central structural member is formed of nickel.

5. A core for an electrically heatable catalytic converter as defined in claim 1 further having the cold resistance of the heater strips in the range of from 0.02 ohms to 0.2 ohms, the total number of heater strips is from 2 to 24, and each heater strip has a cold resistance of approximately 0.07 ohms.

6. A core for an electrically heatable catalytic converter as defined in claim 1 wherein the heater strips are corrugated.

7. A core for an electrically heatable catalytic converter as defined in claim 6 wherein the heater strips are corrugated according to a herringbone or chevron pattern.

8. A core for an electrically heatable catalytic converter as defined in claim 6 wherein the heater strips are corrugated according to a variable pitch pattern.

9. A core for an electrically heatable catalytic converter as defined in claim 1 wherein the thin heater strips are precoated with refractory metal oxide and have a noble metal catalyst carried thereon.

10. A core for an electrically heatable catalytic converter as defined in claim 1 wherein the high temperature resistive metal alloy heater strips are postcoated after assembly with refractory metal oxide and have a noble metal catalyst carried thereon.

11. A core for an electrically heatable catalytic converter as defined in claim 6 wherein the corrugated thin high temperature resistive metal alloy strips are ferritic stainless steel strips.

12. A core for an electrically heatable catalytic converter as defined in claim 1 wherein the thin high temperature resistive metal alloy heater strips are a nickel-chromium alloy.

13. A core for an electrically heatable catalytic converter as defined in claim 9 wherein the refractory metal oxide comprises alumina.

14. A core for an electrically heatable catalytic converter as defined in claim 10 wherein the refractory metal oxide comprises alumina.

15. A core for an electrically heatable catalytic converter as defined in claim 13 wherein the alumina is in the gamma form.

16. A core for an electrically heatable catalytic converter as defined in claim 14 wherein the alumina is in the gamma form.

17. A core for an electrically heatable catalytic converter as defined in claim 13 wherein the refractory metal oxide is a mixture of alumina and ceria.

18. A core for an electrically heatable catalytic converter as defined in claim 9 wherein the noble metal catalyst is selected from platinum, palladium, rhodium, ruthenium and mixtures of two or more of such metals.

19. A core for an electrically heatable catalytic converter as defined in claim 1 wherein the parallel subcircuits are electrically isolated from one another by flexible woven ceramic fiber strips.

20. An electrically heatable catalytic converter comprising (1) a housing, (2) end cap adapters for each end of the housing for adapting said converter for insertion an exhaust line, (3) a core including (a) a central structural member, (b) a segmented outer shell having a plurality of segments, each of said segments being electrically isolated from any other segment except as connected through a plurality of thin high temperature resistive metal alloy heater strips and the central structural member, (c) said plurality of said alloy heater strips tightly spirally wound and forming a monolith, each of said heater strips electrically secured at its proximal end to said central structural member and at its distal end to an outer shell segment, the heater strips connected to a given shell segment being connected in parallel and defining a subcircuit, and the shell segments being connected in series through said central structural member and said heater strips, (d) a diametrally extending bar, said bar being electrically insulated from said central structural member and in juxtaposition with the downstream side of the aforesaid monolith, the outer ends of said bar being welded to the housing, (4) insulation means between the housing and the core, (5) a feed through terminal extending through said housing, secured to one of said shell segments, and adapted to be attached to one pole of a voltage source, (6) a second terminal for attachment to the other pole of a voltage source and attached to a another shell segment where there are an even number of subcircuits and to the central structural member where there are an odd number subcircuits, and (7) a voltage source.

21. An electrically heatable catalytic converter as defined in claim 20 wherein the heater strips are corrugated.

22. A core as defined in claim 1 having two subcircuits in series, each subcircuit having from 4 to 12 corrugated thin high temperature resistive metal alloy heater strips in parallel between a unitary electricity conducting central structural member and an outer shell segment.

* * * * *

UNITED STATES PATENT AND TRADEMARK OFFICE
CERTIFICATE OF CORRECTION

PATENT NO. : 5,140,812

DATED : August 25, 1992

INVENTOR(S) : Cornelison et al

It is certified that error appears in the above-identified patent and that said Letters Patent is hereby corrected as shown below:

Column 16:

Claim 20, line 10, delete "said alloy"

Signed and Sealed this

Twenty-first Day of September, 1993

Attest:

BRUCE LEHMAN

Attesting Officer

Commissioner of Patents and Trademarks